United States Patent [19]

Yotsutani

[11] 3,763,711

[45] Oct. 9, 1973

[54] CONTROL ASSEMBLY FOR RADIO RECEIVER

[75] Inventor: Koichiro Yotsutani, Yao, Japan

[73] Assignee: Sharp Kabushiki Kaisha, Osaka, Japan

[22] Filed: Nov. 3, 1972

[21] Appl. No.: 303,613

[30] Foreign Application Priority Data

Nov. 5, 1971 Japan ............................ 46/104628
May 9, 1972 Japan ............................ 47/54040

[52] U.S. Cl. ............................ 74/10.27
[51] Int. Cl. ............................ F16h 35/18
[58] Field of Search ............................ 74/10.27, 10.8

[56] References Cited

UNITED STATES PATENTS 3,106,098 10/1963 Race ............................ 74/10.8
3,238,796 3/1966 Goffstein ............................ 74/10.27

*Primary Examiner*—Milton Kaufman
*Attorney*—Raymond C. Stewart et al.

[57] ABSTRACT

Disclosed herein is an adjustable control assembly for an automobile radio receiver to provide simple alignment of shaft center positions on the receiver with respect to apertures in the dashboard of an automobile. The radio receiver is generally provided having adjustably mounted volume and tuning control shafts at both ends of the front plate of the housing thereof. These shafts are attached to a frame, which may be moved through a rack and pinion engagement to slide in a lateral direction within the receiver housing, thereby the volume control shaft and the tuning control shaft being so correctly positioned in the apertures in the dashboard.

10 Claims, 5 Drawing Figures

CONTROL ASSEMBLY FOR RADIO RECEIVER

BACKGROUND OF THE INVENTION

This invention relates to a control assembly for use in a radio receiver, and more particularly to an improved control assembly having a control shaft which is easily adjustable with respect to the axis of a fixed shaft mounted on the tuner apparatus of the radio receiver.

In installation of the radio receiver behind the dashboard of an automobile, an airplane or the like, the radio receiver is so mounted as to expose its dial panel and indicator assembly through the window formed in the dashboard and extend its volume and tuning control shafts from the receiver front plate to project outwardly of the radio receiver through the apeatures in the dashboard.

In general, the automobile dashboard has the window to expose the dial assembly and two spaced apertures to accommodate the manual control shafts, the power and volume control shaft and the tuning control shaft. Although the distance between two apertures is generally about 13cm, the relative positions of these apertures vary somewhat between different makes and models of automobiles. Moreover, the vertical positions of two apertures with respect to the window are different in accordance with the models of automobiles.

Thus, the automobile radio receiver wherein the shaft center positions of the volume and tuning control shafts are fixed, can be installed in the automobile only when the shaft center positions and dial assembly position on the radio receiver are completely coincident with the apertures and window in the dashboard. The radio receivers of which the shaft positions are all coincident with the dashboard aperture positions, should be previously chosen and only such chosen ones may be installed in the automobile.

In the past, in order to overcome these disadvantages, the receivers have been provided in which the positions of the two control shafts are individually adjustable within oblique openings formed in the receiver front plate as more disclosed in U.S. Pat. Nos. 2,953,927 and 3,073,171. These conventional receivers utilize the washer assembly fitted into the oblique opening or carried in the opening by a pair of the pins to remain fixedly the control shafts at these installed positions after the adjustment of the shaft positions. However, since the shafts can be selectively mounted on only two alternate positions, any prior art adjustable shaft assembly is not expected to allow greater installation possibilities.

OBJECTS AND SUMMARY OF THE INVENTION

Accordingly, the primary object of this invention is to provide a radio receiver control assembly wherein a control shaft is adjustable in a lateral direction to allow installation in a variety of different supporting member such as a dashboard of an automobile by providing a slidable frame holding the control shaft.

Another object of this invention is to provide a radio receiver control assembly including gear assembly between the movable frame and a receiver housing to move strictly and correctly the shaft center position of the control shaft with respect to the aperture in the dashboard.

Still another object of this invention is to provide a radio receiver control assembly having the movable frame with a height demention equal to the distance between an upper wall and a bottom wall of the receiver housing without necessitating any guide member.

A further object of this invention is to provide a radio receiver control assembly, in which a portion of the peripheral edge of the movable frame is turned upwardly and such turned edge is notched to form a rack portion which engages with a pinion fixedly secured to the receiver housing, thereby ensuring engagement between the rack and the pinion and simplifying the gear assembly without increasing the expenditure on the control shaft construction.

Another object of this invention is to provide a radio receiver control assembly having means for fastening tightly the movable frame to the receiver housing after the adjustment of the shaft positions with respect to the apertures in the dashboard.

These and other objects and novel features of this invention are set forth in the appended claims and this invention as to its organization and its mode of operation will best be understood from a consideration of the following detailed description of the preferred embodiments when used in connection with the accompanying drawings.

DESCRIPTION OF THE PREFERRED EMBODIMENTS

Figure 1:
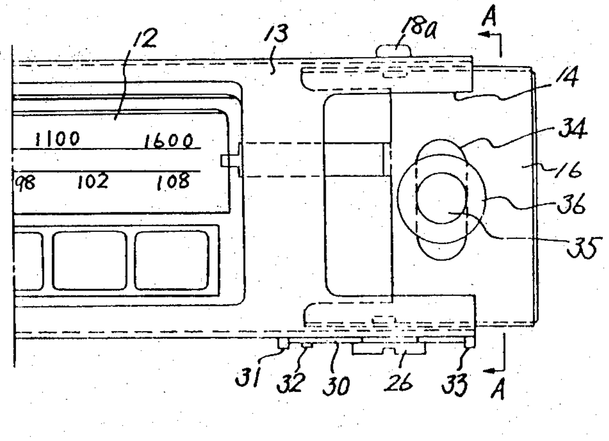
FIG. 1 is a front view of the right half portion of an automobile radio receiver in accordance with this invention.
Figure 2:
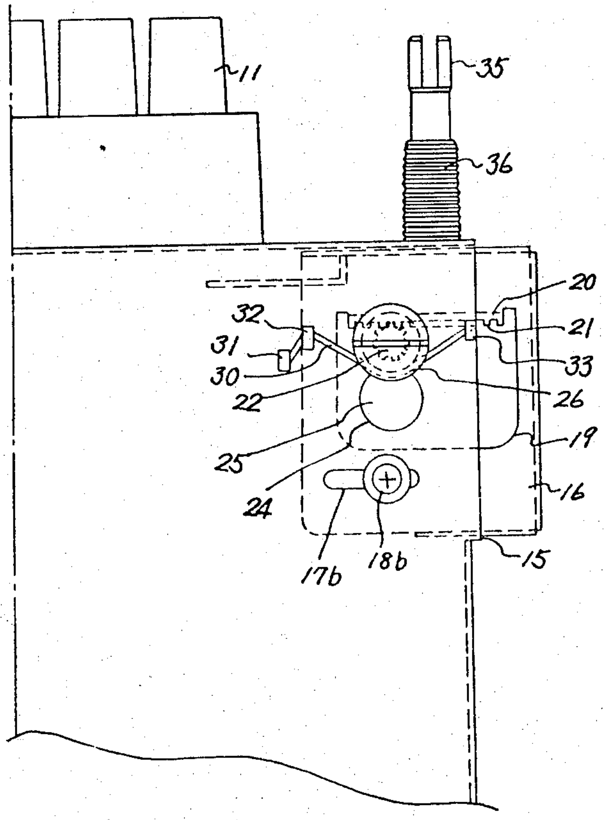
FIG. 2 is a bottom view of the same shown in FIG. 1.

Referring now to FIG. 1, pushbuttons 11 for preset tuning, a dial indicating panel 12, radio receiver circuit components and so forth are enclosed within a receiver housing 13. The front plate of the housing 13 is provided at its opposite sides (only one side in the drawings) with cut portions 14 having a height dimention sufficient to allow lateral movements of control shafts 35. And, the side plates of the housing 13 are provided with cut portions 15 having an area equal to a cross-sectional area of movable frames 16 for holding the control shafts 35 and the cut portions 15 are situated adjacent the first-named cut portions 14. The mounting frames for the control shafts 35 are of rectangular prism with a height dimention approximately identical with that of the receiver housing 13 and a depth dimention approximately identical with a third of that of the housing 13. One of opposite side walls of the frames 16 as well as these rear walls are cut for connection of the control shaft 35 with various components within the housing 13. Thus, with this arrangement, the frames 16 (only one in the drawings) may be moved to slide within the cut portions on the opposite sides of the housing 13 respectively. The upper and bottom walls of the housing 13 positioning against the frame 16 are respectively provided with slots 17*a*, 17*b* within a range of horizontal movement of the frame 16. Protruding bosses 18*a*, 18*b* are so fixedly attached to the frame 16 as to be movable in the slots 17*a*, 17*b* with play together with the horizontal movement of the frame 16. The bosses 18*a*, 18*b* are of male screw type which engages with screw taps (not shown) formed in the frame 16. Therefore, the frame 16 may be moved within a range wherein the bosses 18*a*, 18*b* slide in the slots 17*a*, 17*b*.

Figure 5:
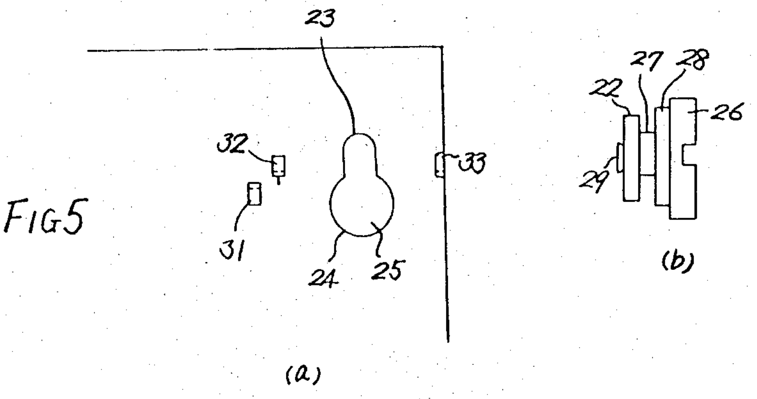
FIGS. 5 (a) and 5 (b) are disjointing views of the gear assembly.

The movable frames 16 and the housing 13 are coupled by the following gear assembly. The frames 16 are provided at the center of the bottom wall thereof with rectangular openings 19, of which each one of the peripheral edges parallel to the front plate of the housing 13 are turned upwardly. Such turned edges 20 are notched to form racks 21. Pinions 22 are attached to the bottom wall of the housing 13 to a position against the racks 21. The housing 13 has keyhole-shaped openings 25 each including a short diameter porton 23 and a long diameter portion 24. Gear-mounted knobs 26, as shown in FIG. 5 (b), comprise supporting sections 27 fitting in the short diameter portions 23, spring contact sections 28 receiving wire springs 30 and having the diameter longer than the supporting sections 27, the wire springs 30 urging the knobs 26 to the short diameter portions 23, and non-circular gear-holding sections 29. The individual pinions 22 are positioned about the outer rims of the gear holding sections 29 so that the pinions 22 are fixedly secured to the knobs 26 by caulking of the projecting end thereof.

In the mode of installation of the pinion-mounted knobs 26 in the receiver housing 13, the pinions 22 are inserted from the long diameter portion 25 into the interior of the housing 13 so that the housing bottom wall is positioned to fit into the supporting sections 27. When the knobs 26 are moved to the short diameter portion 23 of the keyholl-shaped opening 25, the wire spring 30 contacts with the spring contact sections 28 and the both end thereof engage with the turned ears 31, 32, 33. In this manner, the pinions 22 are installed in the interior of the housing 13 and fitted into the openings 19 to engage with the racks 21 formed in the frames 16 with the very simple arrangement.

Figure 3:
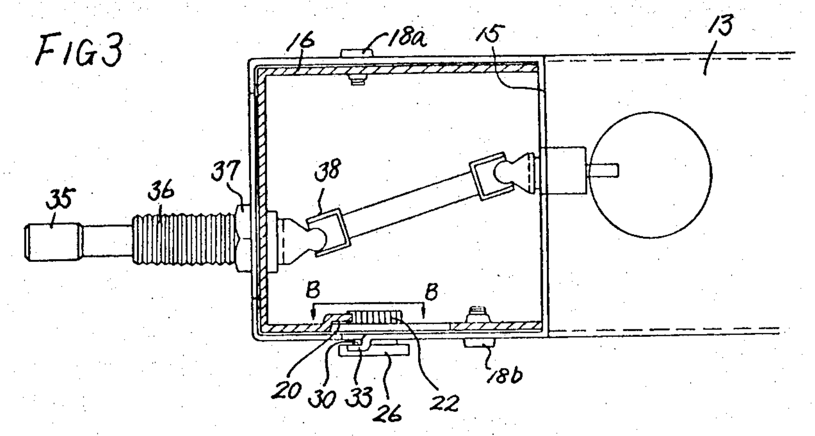
FIG. 3 is a view taken in section on the line A—A of FIG. 1.
Figure 4:
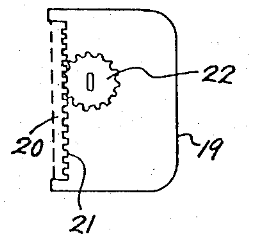
FIG. 4 is a plan view taken on the line B—B of FIG. 3.

In the meanwhile, the front plate of the movable frames 16 are provided with slots 34 perpendicular to the movement direction of the frames 16. Journals 36 for the control shaft 35 for tuning control or power and volume control are provided around the slots 34 to pass therethrough, which are fixedly affixed to the frame 16 by fastening of nuts 37. As viewed in FIG. 3, the control shaft 35 is coupled via a universal joint to a tuning drive shaft within the tuning apparatus.

On the other hand, although not shown in the drawings, power and volume control is accomplished by means of a potentiometer containing a switch associated with a power source. The potentiometer is secured within the frame 16 together with journal therefor and electrical connection of the potentiometer with other components is made behind the frame 16 or in the interior thereof.

Hence, when the automobile radio receiver is installed behind the dashboard of the automobile, the gear mounted knob 26 is rotated to the right or the left by rotation of a screw driver to move horizontally the rack 21 to the right or the left carrying the slidable frame 16. As a consequence, the distance between two control shafts may be equal to that of the dashboard apertures. That is to say, the control shaft 35 can be horizontally slidable by a necessary amount in accordance with the rotation direction and amount of the knob 26.

During the horizontal adjustment of the control shaft 35, since the frame 16 has only about the depth dimension equal to a third of that of the housing 13, the side wall of the frame 16 does not accidentally contact with the inner edges of the dashboard apertures even though the frame 16 is farthest away from the center of the receiver housing 13.

Preferably, the protruding bosses 18 are made up of screws to secure tightly engagement of the slidable frame 16 with the housing 13 after the adjustment of the shaft spacing. Furthermore, the nuts 37 are unfastened to effect the vertical adjustment with respect to the dashboard apertures and are fastened to maintain the vertical position of the control shaft 35 after such adjustment.

As obviously clear, the control assembly embodying this invention previously described may be also applied to automobile stereo tape players and automobile transceivers and so forth.

I claim:

1. A control assembly for use in an electronic apparatus comprising:

a housing containing components of the electronic apparatus and having side plates, at least one of the side plates having a cut portion formed therethrough;

a control shaft of the electronic apparatus for operatively controlling an adjustable component within the housing; and a frame holding the control shaft and being movable in and out of the cut portion of the housing in a certain direction thereby adjusting the shaft center position of the control shaft with respect to the housing.

2. A control assembly for use in an electronic apparatus comprising:

a housing containing components of the electronic apparatus and having side plates, at least one of the side plates having a cut portion formed therethrough;

a control shaft of the electronic apparatus for operatively controlling an adjustable component within the housing;

a frame holding and carrying the control shaft; and a gear assembly movably coupling the frame to the housing thereby the frame being movable in and out of the cut portion of the housing in a certain direction to effect adjustment of the shaft center position of the control shaft with respect to the housing.

3. A radio receiver for installation on supporting member having an aperture therein which may be spaced from a predetermined position by various amounts, the radio receiver comprising:

a receiver housing containing components of the radio receiver, and having a front plate wherein a dial indicating assembly is attached to, and side plates one of which has a cut portion formed therethrough;

a rotatable control shaft of the radio receiver extending from the front plate for manually controlling an adjustable component within the housing;

a frame holding and carrying the control shaft; and a gear assembly movably coupling the frame to the housing thereby the frame being horizontally movable in and out of the cut portion of the housing along the front plate, the control shaft being so positioned on the front plate to fit in the aperture in the supporting member.

4. A radio receiver for installation on supporting member having an aperture therein which may be spaced from a predetermined position by various amounts, the radio receiver comprising:

a receiver housing containing components of the radio receiver, and having a front plate wherein a dial indicating assembly is attached to, and side plates one of which has a cut portion formed therethrough;

a rotatable control shaft of the radio receiver extending from the front plate for manually controlling an adjustable component within the housing;

a frame having a slot perpendicular to the front plate wherein the control shaft is vertically movable to allow vertical adjustment of the shaft position thereof, the frame holding and carrying the control shaft; and a gear assembly causing the frame to be horizontally movable in and out of the cut portion of the housing along the front plate to allow horizontal adjustment of the shaft position of the control shaft, thereby the control shaft being so positioned on the front plate to fit in the aperture in the supporting member.

5. A radio receiver according to claim 3 further comprising an additional frame carrying a volume control shaft, said shafts being so positioned on the front plate to fit in a pair of apertures in the supporting member.

6. A control assembly according to claim 2 wherein the gear assembly comprises a pinion-rack structure between the housing and the frame.

7. A control assembly according to claim 6 wherein the rack is provided by the turned and notched peripheral edge of the frame while the pinion is attached to the housing to engage with the rack.

8. A control assembly according to claim 7 wherein the housing has in its bottom plate an opening including a short diameter portion and a long diameter portion and a spring attached to the bottom plate urges the pinion to the short diameter portion to bring into engagement relation with the rack.

9. A control assembly according to claim 7 wherein the adjustment of the shaft position of the control shaft is accomplishing by rotation of the pinion and resultant movement of the frame.

10. A control assembly according to claim 2 wherein provision is made for guiding the movement of the frame.

* * * * *